(12) United States Patent
Strange et al.

(10) Patent No.: US 12,130,882 B2
(45) Date of Patent: *Oct. 29, 2024

(54) BROWSER-BASED MOBILE IMAGE CAPTURE

(71) Applicant: Mitek Systems, Inc., San Diego, CA (US)

(72) Inventors: Michael Strange, San Diego, CA (US); Robert J. Nies, San Diego, CA (US); Kirk Beitz, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,309

(22) Filed: Jul. 7, 2023

(65) Prior Publication Data

US 2023/0359687 A1   Nov. 9, 2023

Related U.S. Application Data

(63) Continuation of application No. 17/189,085, filed on Mar. 1, 2021, now Pat. No. 11,741,181, which is a
(Continued)

(51) Int. Cl.
*G06F 16/958* (2019.01)
*G06Q 10/10* (2023.01)
(Continued)

(52) U.S. Cl.
CPC .......... *G06F 16/958* (2019.01); *G06Q 10/10* (2013.01); *G06Q 20/042* (2013.01);
(Continued)

(58) Field of Classification Search
CPC ........ H04N 1/00244; H04N 2201/001; H04N 1/00307; H04N 2101/00;
(Continued)

(56) References Cited

U.S. PATENT DOCUMENTS 4,311,914 A   1/1982   Huber
5,326,959 A   7/1994   Perazza
(Continued)

FOREIGN PATENT DOCUMENTS

CA         2773730 A1    4/2012
KR   1020040076131 A    8/2004
(Continued)

OTHER PUBLICATIONS

PDF417, Wikipedia: the free encyclopedia, Oct. 21, 2008, https://en.wikipedia.org/w/index.php?title=PDF417&oldid=246681430 (Year: 2008); 3 pages.
(Continued)

*Primary Examiner* — Scott S Trotter
(74) *Attorney, Agent, or Firm* — Procopio, Cory, Hargreaves & Savitch LLP

(57) ABSTRACT

Systems and methods for integrating mobile image capture with an internet browser application on a mobile device are provided, wherein a user viewing a web page via the internet browser application can initiate a mobile image capture process on the mobile device through the web page, capture images with a mobile image capture user interface, and then provide secure access to the captured images for the web page in order to utilize the content of the captured images. The mobile image capture process is accessible through any internet browser application via the mobile device and allows any service running on a web page to benefit from the ability to capture an image on the mobile device and obtain the content of the image through mobile image processing. The browser-based mobile image capture allows mobile devices which do not run certain third party applications to utilize mobile image capture and processing.

20 Claims, 5 Drawing Sheets

Related U.S. Application Data continuation of application No. 14/568,085, filed on Dec. 11, 2014, now Pat. No. 10,963,535, which is a continuation-in-part of application No. 14/042,677, filed on Sep. 30, 2013, now Pat. No. 9,324,073, and a continuation-in-part of application No. 14/042,719, filed on Sep. 30, 2013, now Pat. No. 9,672,510, and a continuation-in-part of application No. 13/769,833, filed on Feb. 19, 2013, now abandoned.

(60) Provisional application No. 61/914,847, filed on Dec. 11, 2013.

(51) Int. Cl.
*G06Q 20/04* (2012.01)
*G06Q 20/32* (2012.01)
*H04L 67/02* (2022.01)
*H04N 1/00* (2006.01)
*H04N 101/00* (2006.01)

(52) U.S. Cl.
CPC ......... *G06Q 20/3276* (2013.01); *H04L 67/02* (2013.01); *H04N 1/00244* (2013.01); *H04N 1/00307* (2013.01); *H04N 2101/00* (2013.01); *H04N 2201/001* (2013.01); *H04N 2201/0084* (2013.01)

(58) Field of Classification Search
CPC . H04N 2201/0084; H04L 67/02; H04L 29/08; G06Q 10/10; G06Q 20/3276; G06Q 20/042; G06F 16/958; G06F 17/30; G06F 17/22
See application file for complete search history.

(56) References Cited

U.S. PATENT DOCUMENTS

| | | |
|---|---|---|
| 5,600,732 A | 2/1997 | Ott et al. |
| 5,751,841 A | 5/1998 | Leong et al. |
| 5,761,686 A | 6/1998 | Bloomberg |
| 5,920,847 A | 7/1999 | Kolling et al. |
| 5,966,473 A | 10/1999 | Takahashi et al. |
| 5,999,636 A | 12/1999 | Juang |
| 6,038,351 A | 3/2000 | Rigakos |
| 6,038,553 A | 3/2000 | Hyde, Jr. |
| 6,070,150 A | 5/2000 | Remington et al. |
| 6,125,362 A | 9/2000 | Elworthy |
| 6,282,326 B1 | 8/2001 | Lee et al. |
| 6,304,684 B1 | 10/2001 | Niczyporuk et al. |
| 6,345,130 B1 | 2/2002 | Dahl |
| 6,408,094 B1 | 6/2002 | Mirzaoff et al. |
| 6,516,078 B1 | 2/2003 | Yang et al. |
| 6,621,919 B2 | 9/2003 | Mennie et al. |
| 6,735,341 B1 | 5/2004 | Horie et al. |
| 6,807,294 B2 | 10/2004 | Yamazaki |
| 6,947,610 B2 | 9/2005 | Sun |
| 6,985,631 B2 | 1/2006 | Zhang |
| 6,993,205 B1 | 1/2006 | Lorie et al. |
| 7,020,320 B2 | 3/2006 | Filatov |
| 7,072,862 B1 | 7/2006 | Wilson |
| 7,133,558 B1 | 11/2006 | Ohara et al. |
| 7,245,765 B2 | 7/2007 | Myers et al. |
| 7,283,656 B2 | 10/2007 | Blake et al. |
| 7,301,564 B2 | 11/2007 | Fan |
| 7,331,523 B2 | 2/2008 | Meier et al. |
| 7,376,258 B2 | 5/2008 | Klein et al. |
| 7,377,425 B1 | 5/2008 | Ma et al. |
| 7,426,316 B2 | 9/2008 | Vehvilinen |
| 7,433,098 B2 | 10/2008 | Klein et al. |
| 7,478,066 B2 | 1/2009 | Remington et al. |
| 7,548,641 B2 | 6/2009 | Gilson et al. |
| 7,558,418 B2 | 7/2009 | Verma et al. |
| 7,584,128 B2 | 9/2009 | Mason et al. |
| 7,593,595 B2 | 9/2009 | Heaney, Jr. et al. |
| 7,606,741 B2 | 10/2009 | King et al. |
| 7,636,483 B2 | 12/2009 | Yamaguchi et al. |
| 7,735,721 B1 | 6/2010 | Ma et al. |
| 7,778,457 B2 | 8/2010 | Nepomniachtchi et al. |
| 7,793,831 B2 | 9/2010 | Beskitt |
| 7,793,835 B1 | 9/2010 | Coggeshall et al. |
| 7,817,854 B2 | 10/2010 | Taylor |
| 7,869,098 B2 | 1/2011 | Corso et al. |
| 7,873,200 B1 | 1/2011 | Oakes, III et al. |
| 7,876,949 B1 | 1/2011 | Oakes, III et al. |
| 7,949,176 B2 | 5/2011 | Nepomniachtchi |
| 7,950,698 B2 | 5/2011 | Popadic et al. |
| 7,953,268 B2 | 5/2011 | Nepomniachtchi |
| 7,982,770 B1 | 5/2011 | Kahn et al. |
| 7,974,899 B1 | 7/2011 | Prasad et al. |
| 7,978,900 B2 | 7/2011 | Nepomniachtchi et al. |
| 7,983,468 B2 | 7/2011 | Ibikunle et al. |
| 7,986,346 B2 | 7/2011 | Kaneda et al. |
| 7,995,196 B1 | 8/2011 | Fraser |
| 7,996,317 B1 | 8/2011 | Gurz |
| 8,000,514 B2 | 8/2011 | Nepomniachtchi et al. |
| 8,023,155 B2 | 9/2011 | Jiang |
| 8,025,226 B1 | 9/2011 | Hopkins et al. |
| 8,109,436 B1 | 2/2012 | Hopkins, III |
| 8,118,216 B2 | 2/2012 | Hoch et al. |
| 8,121,948 B1 | 2/2012 | Gustin et al. |
| 8,126,252 B2 | 2/2012 | Abernethy et al. |
| 8,160,149 B2 | 4/2012 | Demos |
| 8,180,137 B2 | 5/2012 | Faulkner et al. |
| 8,233,714 B2 | 7/2012 | Zuev et al. |
| 8,238,638 B2 | 8/2012 | Mueller et al. |
| 8,290,237 B1 | 10/2012 | Burks et al. |
| 8,300,917 B2 | 10/2012 | Borgia et al. |
| 8,320,657 B1 | 11/2012 | Burks et al. |
| 8,326,015 B2 | 12/2012 | Nepomniachtchi |
| 8,339,642 B2 | 12/2012 | Ono |
| 8,340,452 B2 | 12/2012 | Marchesotti |
| 8,358,826 B1 | 1/2013 | Medina et al. |
| 8,370,254 B1 | 2/2013 | Hopkins et al. |
| 8,374,383 B2 | 2/2013 | Long et al. |
| 8,379,914 B2 | 2/2013 | Nepomniachtchi et al. |
| 8,442,844 B1 | 5/2013 | Trandal et al. |
| 8,532,419 B2 | 9/2013 | Coleman |
| 8,538,124 B1 | 9/2013 | Harpel et al. |
| 8,540,158 B2 | 9/2013 | Lei et al. |
| 8,542,921 B1 | 9/2013 | Medina |
| 8,559,766 B2 | 10/2013 | Tilt et al. |
| 8,582,862 B2 | 11/2013 | Nepomniachtchi et al. |
| 8,688,579 B1 | 4/2014 | Ethington et al. |
| 8,699,779 B1 | 4/2014 | Prasad et al. |
| 8,837,833 B1 | 9/2014 | Wang et al. |
| 8,861,883 B2 | 10/2014 | Tanaka |
| 8,879,783 B1 | 11/2014 | Wang et al. |
| 8,959,033 B1 | 2/2015 | Oakes, III et al. |
| 8,977,571 B1 | 3/2015 | Bueche, Jr. et al. |
| 9,058,512 B1 | 6/2015 | Medina, III |
| 9,208,393 B2 | 12/2015 | Kotovich et al. |
| 9,460,141 B1 | 10/2016 | Coman |
| 9,613,258 B2 | 4/2017 | Chen et al. |
| 9,679,214 B2 | 6/2017 | Kotovich et al. |
| 9,710,702 B2 | 7/2017 | Nepomniachtchi et al. |
| 9,773,186 B2 | 9/2017 | Nepomniachtchi et al. |
| 9,786,011 B1 | 10/2017 | Engelhorn et al. |
| 9,842,331 B2 | 12/2017 | Nepomniachtchi et al. |
| 10,095,947 B2 | 10/2018 | Nepomniachtchi et al. |
| 10,102,583 B2 | 10/2018 | Strange |
| 10,275,673 B2 | 4/2019 | Kotovich et al. |
| 10,360,447 B2 | 7/2019 | Nepomniachtchi et al. |
| 10,373,136 B1 | 8/2019 | Pollack et al. |
| 10,452,908 B1 | 10/2019 | Ramanathan et al. |
| 10,546,206 B2 | 1/2020 | Nepomniachtchi et al. |
| 10,621,660 B1 | 4/2020 | Medina et al. |
| 10,789,496 B2 | 9/2020 | Kotovich et al. |
| 10,789,501 B2 | 9/2020 | Nepomniachtchi et al. |
| 10,891,475 B2 | 1/2021 | Nepomniachtchi et al. |
| 10,909,362 B2 | 2/2021 | Nepomniachtchi et al. |
| 11,157,731 B2 | 10/2021 | Nepomniachtchi et al. |
| 11,380,113 B2 | 7/2022 | Nepomniachtchi et al. |

(56) References Cited

U.S. PATENT DOCUMENTS

| | | |
|---|---|---|
| 11,393,272 B2 | 7/2022 | Kriegsfeld et al. |
| 2001/0014183 A1 | 8/2001 | Sansom-Wai et al. |
| 2001/0016084 A1 | 8/2001 | Pollard et al. |
| 2001/0019334 A1 | 9/2001 | Carrai et al. |
| 2001/0019664 A1 | 9/2001 | Pilu |
| 2001/0044899 A1 | 11/2001 | Levy |
| 2002/0003896 A1 | 1/2002 | Yamazaki |
| 2002/0012462 A1 | 1/2002 | Fujiwara |
| 2002/0023055 A1 | 2/2002 | Antognini et al. |
| 2002/0037097 A1 | 3/2002 | Hoyos et al. |
| 2002/0041717 A1 | 4/2002 | Murata et al. |
| 2002/0044689 A1 | 4/2002 | Roustaei et al. |
| 2002/0046341 A1 | 4/2002 | Kazaks et al. |
| 2002/0067846 A1 | 6/2002 | Foley |
| 2002/0073044 A1 | 6/2002 | Singhal |
| 2002/0077976 A1 | 6/2002 | Meyer et al. |
| 2002/0080013 A1 | 6/2002 | Anderson, III et al. |
| 2002/0085745 A1 | 7/2002 | Jones et al. |
| 2002/0120846 A1 | 8/2002 | Stewart et al. |
| 2002/0128967 A1 | 9/2002 | Meyer et al. |
| 2002/0138351 A1 | 9/2002 | Houvener et al. |
| 2002/0143804 A1 | 10/2002 | Dowdy |
| 2002/0150279 A1 | 10/2002 | Scott et al. |
| 2003/0009420 A1 | 1/2003 | Jones |
| 2003/0072568 A1 | 4/2003 | Lin et al. |
| 2003/0086615 A1 | 5/2003 | Dance et al. |
| 2003/0099379 A1 | 5/2003 | Monk et al. |
| 2003/0099401 A1 | 5/2003 | Driggs et al. |
| 2003/0156201 A1 | 8/2003 | Zhang |
| 2003/0161523 A1 | 8/2003 | Moon et al. |
| 2003/0177100 A1 | 9/2003 | Filatov |
| 2004/0012679 A1 | 1/2004 | Fan |
| 2004/0017947 A1 | 1/2004 | Yang |
| 2004/0024769 A1 | 2/2004 | Forman et al. |
| 2004/0037448 A1 | 2/2004 | Brundage |
| 2004/0081332 A1 | 4/2004 | Tuttle et al. |
| 2004/0109597 A1 | 6/2004 | Lugg |
| 2004/0205474 A1 | 10/2004 | Eskin et al. |
| 2004/0213434 A1 | 10/2004 | Emerson et al. |
| 2004/0213437 A1 | 10/2004 | Howard et al. |
| 2004/0218799 A1 | 11/2004 | Mastie et al. |
| 2004/0236688 A1 | 11/2004 | Bozeman |
| 2004/0236690 A1 | 11/2004 | Bogosian et al. |
| 2004/0247168 A1 | 12/2004 | Pintsov et al. |
| 2005/0011957 A1 | 1/2005 | Attia et al. |
| 2005/0065893 A1 | 3/2005 | Josephson |
| 2005/0071283 A1 | 3/2005 | Randle et al. |
| 2005/0080698 A1 | 4/2005 | Perg et al. |
| 2005/0091161 A1 | 4/2005 | Gustin et al. |
| 2005/0097046 A1 | 5/2005 | Singfield |
| 2005/0100216 A1 | 5/2005 | Myers et al. |
| 2005/0125295 A1 | 6/2005 | Tidwell et al. |
| 2005/0129300 A1 | 6/2005 | Sandison et al. |
| 2005/0141028 A1 | 6/2005 | Koppich |
| 2005/0143136 A1 | 6/2005 | Lev et al. |
| 2005/0163362 A1 | 7/2005 | Jones et al. |
| 2005/0180661 A1 | 8/2005 | El Bernoussi et al. |
| 2005/0192897 A1 | 9/2005 | Rogers et al. |
| 2005/0196069 A1 | 9/2005 | Yonaha |
| 2005/0196071 A1 | 9/2005 | Prakash et al. |
| 2005/0213805 A1 | 9/2005 | Blake et al. |
| 2005/0219367 A1 | 10/2005 | Kanda et al. |
| 2005/0220324 A1 | 10/2005 | Klein et al. |
| 2005/0229010 A1 | 10/2005 | Monk et al. |
| 2005/0242186 A1 | 11/2005 | Ohbuchi |
| 2005/0261990 A1 | 11/2005 | Gocht et al. |
| 2006/0008167 A1 | 1/2006 | Yu et al. |
| 2006/0008267 A1 | 1/2006 | Kim |
| 2006/0012699 A1 | 1/2006 | Miki |
| 2006/0039629 A1 | 2/2006 | Li et al. |
| 2006/0045322 A1 | 3/2006 | Clarke et al. |
| 2006/0045342 A1 | 3/2006 | Kim et al. |
| 2006/0045344 A1 | 3/2006 | Paxton et al. |
| 2006/0045379 A1 | 3/2006 | Heaney et al. |
| 2006/0071950 A1 | 4/2006 | Kurzweil et al. |
| 2006/0072822 A1 | 4/2006 | Hatzav et al. |
| 2006/0088214 A1 | 4/2006 | Handley et al. |
| 2006/0106717 A1 | 5/2006 | Randle et al. |
| 2006/0140504 A1 | 6/2006 | Fujimoto et al. |
| 2006/0164682 A1 | 7/2006 | Lev |
| 2006/0177118 A1 | 8/2006 | Ibikunle et al. |
| 2006/0182331 A1 | 8/2006 | Gilson et al. |
| 2006/0186194 A1 | 8/2006 | Richardson et al. |
| 2006/0210192 A1 | 9/2006 | Orhun |
| 2006/0221415 A1 | 10/2006 | Kawamoto |
| 2006/0242063 A1 | 10/2006 | Peterson et al. |
| 2006/0280354 A1 | 12/2006 | Murray |
| 2006/0291727 A1 | 12/2006 | Bargeron |
| 2007/0009155 A1 | 1/2007 | Potts et al. |
| 2007/0053574 A1 | 3/2007 | Verma et al. |
| 2007/0058851 A1 | 3/2007 | Quine et al. |
| 2007/0064991 A1 | 3/2007 | Douglas et al. |
| 2007/0071324 A1 | 3/2007 | Thakur |
| 2007/0076940 A1 | 4/2007 | Goodall et al. |
| 2007/0081796 A1 | 4/2007 | Fredlund et al. |
| 2007/0084911 A1 | 4/2007 | Crowell |
| 2007/0086642 A1 | 4/2007 | Foth et al. |
| 2007/0086643 A1 | 4/2007 | Spier et al. |
| 2007/0110277 A1 | 5/2007 | Hayduchok et al. |
| 2007/0114785 A1 | 5/2007 | Porter |
| 2007/0118391 A1 | 5/2007 | Malaney et al. |
| 2007/0131759 A1 | 6/2007 | Cox et al. |
| 2007/0140678 A1 | 6/2007 | Yost et al. |
| 2007/0154071 A1 | 7/2007 | Lin et al. |
| 2007/0156438 A1 | 7/2007 | Popadic et al. |
| 2007/0168382 A1 | 7/2007 | Tillberg et al. |
| 2007/0171288 A1 | 7/2007 | Inoue et al. |
| 2007/0174214 A1 | 7/2007 | Welsh et al. |
| 2007/0195174 A1 | 8/2007 | Oren |
| 2007/0206877 A1 | 9/2007 | Wu et al. |
| 2007/0211964 A1 | 9/2007 | Agam et al. |
| 2007/0214078 A1 | 9/2007 | Coppinger |
| 2007/0244782 A1 | 10/2007 | Chimento |
| 2007/0265887 A1 | 11/2007 | Mclaughlin et al. |
| 2007/0288382 A1 | 12/2007 | Narayanan et al. |
| 2007/0297664 A1 | 12/2007 | Blaikie |
| 2008/0010215 A1 | 1/2008 | Rackley, III et al. |
| 2008/0031543 A1 | 2/2008 | Nakajima et al. |
| 2008/0040259 A1 | 2/2008 | Snow et al. |
| 2008/0040280 A1 | 2/2008 | Davis et al. |
| 2008/0062437 A1 | 3/2008 | Rizzo |
| 2008/0086420 A1 | 4/2008 | Gilder et al. |
| 2008/0089573 A1 | 4/2008 | Mori et al. |
| 2008/0128505 A1 | 6/2008 | Challa et al. |
| 2008/0152238 A1 | 6/2008 | Sarkar |
| 2008/0174815 A1 | 7/2008 | Komaki |
| 2008/0183576 A1 | 7/2008 | Kim et al. |
| 2008/0192129 A1 | 8/2008 | Walker et al. |
| 2008/0193020 A1 | 8/2008 | Sibiryakov et al. |
| 2008/0212901 A1 | 9/2008 | Castiglia et al. |
| 2008/0231714 A1 | 9/2008 | Estevez et al. |
| 2008/0235263 A1 | 9/2008 | Riaz et al. |
| 2008/0247629 A1 | 10/2008 | Gilder et al. |
| 2008/0249931 A1 | 10/2008 | Gilder et al. |
| 2008/0249936 A1 | 10/2008 | Miller et al. |
| 2008/0267510 A1 | 10/2008 | Paul et al. |
| 2008/0306787 A1 | 12/2008 | Hamilton et al. |
| 2009/0041377 A1 | 2/2009 | Edgar |
| 2009/0063431 A1 | 3/2009 | Erol et al. |
| 2009/0092322 A1 | 4/2009 | Erol et al. |
| 2009/0108080 A1 | 4/2009 | Meyer et al. |
| 2009/0114716 A1 | 5/2009 | Ramachandran |
| 2009/0125510 A1 | 5/2009 | Graham et al. |
| 2009/0141962 A1 | 6/2009 | Borgia et al. |
| 2009/0159659 A1 | 6/2009 | Norris et al. |
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0185752 A1 | 7/2009 | Dwivedula et al. |
| 2009/0190830 A1 | 7/2009 | Hasegawa |
| 2009/0196485 A1 | 8/2009 | Mueller et al. |
| 2009/0198493 A1 | 8/2009 | Hakkani-Tur et al. |
| 2009/0201541 A1 | 8/2009 | Neogi et al. |

(56) References Cited

U.S. PATENT DOCUMENTS

| | | |
|---|---|---|
| 2009/0216672 A1 | 8/2009 | Zulf |
| 2009/0261158 A1 | 10/2009 | Lawson |
| 2009/0265134 A1 | 10/2009 | Sambasivan et al. |
| 2009/0271287 A1 | 10/2009 | Halpern |
| 2009/0285444 A1 | 11/2009 | Erol et al. |
| 2010/0030524 A1 | 2/2010 | Warren |
| 2010/0037059 A1 | 2/2010 | Sun et al. |
| 2010/0038839 A1 | 2/2010 | Dewitt et al. |
| 2010/0073735 A1 | 3/2010 | Hunt et al. |
| 2010/0074547 A1 | 3/2010 | Yu et al. |
| 2010/0080471 A1 | 4/2010 | Haas et al. |
| 2010/0082470 A1 | 4/2010 | Walach et al. |
| 2010/0102119 A1 | 4/2010 | Gustin et al. |
| 2010/0104171 A1 | 4/2010 | Faulkner et al. |
| 2010/0114765 A1 | 5/2010 | Gustin et al. |
| 2010/0114766 A1 | 5/2010 | Gustin et al. |
| 2010/0114771 A1 | 5/2010 | Gustin et al. |
| 2010/0114772 A1 | 5/2010 | Gustin et al. |
| 2010/0150424 A1 | 6/2010 | Nepomniachtchi et al. |
| 2010/0161466 A1 | 6/2010 | Gilder |
| 2010/0200660 A1 | 8/2010 | Moed et al. |
| 2010/0208282 A1 | 8/2010 | Isaev |
| 2010/0239160 A1 | 9/2010 | Enomoto et al. |
| 2010/0246972 A1 | 9/2010 | Koyama et al. |
| 2010/0253787 A1 | 10/2010 | Grant |
| 2010/0254604 A1 | 10/2010 | Prabhakara et al. |
| 2010/0284611 A1 | 11/2010 | Lee et al. |
| 2011/0013822 A1 | 1/2011 | Blackson et al. |
| 2011/0026810 A1 | 2/2011 | Hu |
| 2011/0052065 A1 | 3/2011 | Nepomniachtchi et al. |
| 2011/0075936 A1 | 3/2011 | Deaver |
| 2011/0081051 A1 | 4/2011 | Tayal et al. |
| 2011/0091092 A1 | 4/2011 | Nepomniachtchi et al. |
| 2011/0134248 A1 | 6/2011 | Heit et al. |
| 2011/0170740 A1 | 7/2011 | Coleman |
| 2011/0188759 A1 | 8/2011 | Filimonova et al. |
| 2011/0194750 A1 | 8/2011 | Nepomniachtchi |
| 2011/0249905 A1 | 10/2011 | Singh et al. |
| 2011/0255795 A1 | 10/2011 | Nakamura |
| 2011/0280450 A1 | 11/2011 | Nepomniachtchi et al. |
| 2011/0289028 A1 | 11/2011 | Sato |
| 2012/0010885 A1 | 1/2012 | Hakkani-Tr et al. |
| 2012/0023567 A1 | 1/2012 | Hammad |
| 2012/0030104 A1 | 2/2012 | Huff et al. |
| 2012/0033892 A1 | 2/2012 | Blenkhorn et al. |
| 2012/0051649 A1 | 3/2012 | Saund et al. |
| 2012/0070062 A1 | 3/2012 | Houle et al. |
| 2012/0072859 A1 | 3/2012 | Wang et al. |
| 2012/0086989 A1 | 4/2012 | Collins et al. |
| 2012/0106802 A1 | 5/2012 | Hsieh et al. |
| 2012/0109792 A1 | 5/2012 | Eftekhari et al. |
| 2012/0113489 A1 | 5/2012 | Heit et al. |
| 2012/0150773 A1 | 6/2012 | Dicorpo et al. |
| 2012/0197640 A1 | 8/2012 | Hakkani-Tr et al. |
| 2012/0201416 A1 | 8/2012 | Dewitt et al. |
| 2012/0226600 A1 | 9/2012 | Dolev |
| 2012/0230577 A1 | 9/2012 | Calman et al. |
| 2012/0265655 A1 | 10/2012 | Stroh |
| 2012/0278336 A1 | 11/2012 | Malik et al. |
| 2012/0308139 A1 | 12/2012 | Dhir |
| 2013/0004076 A1 | 1/2013 | Koo et al. |
| 2013/0022231 A1 | 1/2013 | Nepomniachtchi et al. |
| 2013/0051610 A1 | 2/2013 | Roach et al. |
| 2013/0058531 A1 | 3/2013 | Hedley et al. |
| 2013/0085935 A1 | 4/2013 | Nepomniachtchi et al. |
| 2013/0120595 A1 | 5/2013 | Roach et al. |
| 2013/0148862 A1 | 6/2013 | Roach et al. |
| 2013/0155474 A1 | 6/2013 | Roach et al. |
| 2013/0181054 A1 | 7/2013 | Durham et al. |
| 2013/0182002 A1 | 7/2013 | Macciola et al. |
| 2013/0182951 A1 | 7/2013 | Shustorovich et al. |
| 2013/0182973 A1 | 7/2013 | Macciola et al. |
| 2013/0202185 A1 | 8/2013 | Irwin, Jr. et al. |
| 2013/0204777 A1 | 8/2013 | Irwin, Jr. et al. |
| 2013/0223721 A1 | 8/2013 | Nepomniachtchi et al. |
| 2013/0272607 A1 | 10/2013 | Chattopadhyay et al. |
| 2013/0297353 A1 | 11/2013 | Strange et al. |
| 2013/0311362 A1 | 11/2013 | Milam et al. |
| 2013/0317865 A1 | 11/2013 | Tofte et al. |
| 2013/0325706 A1 | 12/2013 | Wilson et al. |
| 2014/0032406 A1 | 1/2014 | Roach et al. |
| 2014/0037183 A1 | 2/2014 | Gorski et al. |
| 2014/0040141 A1 | 2/2014 | Gauvin et al. |
| 2014/0044303 A1 | 2/2014 | Chakraborti |
| 2014/0046841 A1 | 2/2014 | Gauvin et al. |
| 2014/0064621 A1 | 3/2014 | Reese et al. |
| 2014/0108456 A1 | 4/2014 | Ramachandrula et al. |
| 2014/0126790 A1 | 5/2014 | Duchesne et al. |
| 2014/0133767 A1 | 5/2014 | Lund et al. |
| 2014/0172467 A1 | 6/2014 | He et al. |
| 2014/0188715 A1 | 7/2014 | Barlok et al. |
| 2014/0233837 A1 | 8/2014 | Sandoz et al. |
| 2014/0254887 A1 | 9/2014 | Amtrup et al. |
| 2014/0258838 A1 | 9/2014 | Evers et al. |
| 2014/0270540 A1 | 9/2014 | Spector et al. |
| 2014/0281871 A1 | 9/2014 | Brunner et al. |
| 2014/0307959 A1 | 10/2014 | Filimonova et al. |
| 2015/0012382 A1 | 1/2015 | Ceribelli et al. |
| 2015/0012442 A1 | 1/2015 | Ceribelli et al. |
| 2015/0040001 A1 | 2/2015 | Kannan et al. |
| 2015/0142545 A1 | 5/2015 | Ceribelli et al. |
| 2015/0142643 A1 | 5/2015 | Ceribelli et al. |
| 2015/0334184 A1 | 11/2015 | Liverance |
| 2016/0092730 A1 | 3/2016 | Smirnov et al. |
| 2017/0185972 A1 | 6/2017 | Bozeman |
| 2017/0316263 A1 | 11/2017 | Nepomniachtchi et al. |
| 2018/0101751 A1 | 4/2018 | Ghosh et al. |
| 2018/0101836 A1 | 4/2018 | Nepomniachtchi et al. |
| 2018/0240081 A1 | 8/2018 | Doyle et al. |
| 2020/0304650 A1 | 9/2020 | Roach et al. |
| 2020/0342248 A1 | 10/2020 | Nepomniachtchi et al. |
| 2021/0090372 A1 | 3/2021 | Kriegsfeld et al. |
| 2022/0351161 A1 | 11/2022 | Roach et al. |

FOREIGN PATENT DOCUMENTS

| | | |
|---|---|---|
| KR | 1020070115834 A | 12/2007 |
| WO | 03069425 A2 | 8/2003 |
| WO | 2006075967 A1 | 7/2006 |
| WO | 2006136958 A2 | 12/2006 |
| WO | 2012144957 A1 | 10/2012 |

OTHER PUBLICATIONS

"OCR: The Most Important Scanning Feature You Never Knew You Needed." hp (blog), Feb. 24, 2012. Accessed May 13, 2015. http://h71036.www7.hp.com/hho/cache/608037-0-0-39-121.html.

Abdulkader et al. "Low Cost Correction of OCR Errors Using Learning in a Multi-Engine Environment." Proceedings of the 10th International Conference on Document Analysis and Recognition (ICDAR '09). IEEE Computer Society, Washington, D.C., USA. pp. 576-580. http://dx.doi.org/10.1109/ICDAR.2009.24.

Bassil, Youssef. "Ocr Post-Processing Error Correction Algorithm Using Google's Online Spelling Suggestion." Journal of Emergin Trends in Computing and Information Sciences 3, No. 1 (Jan. 2012): 1. Accessed May 13, 2015. http://arxiv.org/ftp/arxiv/papers/1204/1204.0191.pdf.

Bieniecki et al. "Image preprocessing for improving OCR accuracy." Perspective Technologies and Methods in MEMS Design, 2007. International Conference on MEMSTECH 2007. IEEE, 2007.

Chattopadhyay et al. "On the Enhancement and Binarization of Mobile Captured Vehicle Identification No. for an Embedded Solution." 10th IAPR International Workshop on Document Analysis Systems (DAS), 2012. Pages 235-239. Mar. 27-29, 2012.

Cook, John. "Three Algorithms for Converting Color to Grayscale." Singular Value Consulting. Aug. 24, 2009. Accessed May 13, 2015. http://www.johndcook.com/blog/2009/08/24/algorithms-convert-color-grayscale/.

Gatos et al. "Improved Document Image Binarization by Using a Combination of Multiple Binarization Techniques and Adapted Edge Information." 19th International Conference on Pattern Recognition, 2008. IEEE.

(56) References Cited

OTHER PUBLICATIONS

He et al, "Corner deterctor Based on Global and Local Curvature Properties" Optical Engineering 47(5), 0570008 (2008).
International Search Report and Written Opinion received in PCT/US2011/056593, mailed May 30, 2012, 9 pages.
International Search Report issued in related International Application No. PCT/US2011/056593 dated May 30, 2012 (3 pages).
Notice of Allowance dated Feb. 22, 2023 received in U.S. Appl. No. 17/236,373 in 30 pages.
Notice of Allowance for related U.S. Appl. No. 16/160,796, mailed on Jan. 22, 2021, in 17 pages.
Notice of Allowance for related U.S. Appl. No. 16/579,625, mailed on Jan. 13, 2020 in 27 pages.
Notice of Allowance for related U.S. Appl. No. 16/742,439, mailed on Sep. 18, 2020, in 39 pages.
Notice of Allowance for related U.S. Appl. No. 16/987,782, mailed May 17, 2023, in 9 pages.
Notice of Allowance for related U.S. Appl. No. 17/189,085, mailed on Apr. 12, 2023, in 8 pages.
Notice of Allowance for related U.S. Appl. No. 17/829,025, mailed on Apr. 11, 2023, in 13 pages.
Notice of Allowance for related U.S. Appl. No. 17/829,025, mailed on Apr. 19, 2023, in 4 pages.
Office Action dated Feb. 1, 2023 in related U.S. Appl. No. 16/987,782, in 104 pages.
Office Action dated Jan. 12, 2023 in related U.S. Appl. No. 17/479,904, in 34 pages.
Office Action dated Jan. 9, 2020 for related U.S. Appl. No. 16/397,728 in 56 pages.
Office Action dated Jul. 11, 2019 for related U.S. Appl. No. 15/614,456 in 45 pages.
Office Action dated Jul. 26, 2019 for related U.S. Appl. No. 16/282,250 in 21 pages.
Office Action dated Mar. 20, 2020 in related U.S. Appl. No. 16/282,250, in 20 pages.
Office Action dated May 27, 2020 for related U.S. Appl. No. 16/282,250 in 18 pages.
Office Action dated Sep. 25, 2019 for related U.S. Appl. No. 16/518,815, in 10 pages.
Office Action for related CA Patent Application No. 2,773,730, dated Aug. 21, 2017, in 4 pages. .
Office Action for related U.S. Appl. No. 16/259,896, mailed on Dec. 12, 2019, in 22 pages.
Office Action for related U.S. Appl. No. 17/983,785, mailed on Mar. 30, 2023, in 46 pages.
Relativity. "Searching Manual." Aug. 27, 2010. Accessed May 13, 2015. http://www.inventus.com/wp-content/uploads/2010/09/Relativity-Searching-Manual-6.6.pdf.
Shah et al. "OCR-Based chassis-nunber recognition using artificial neural networks." 2009 IEEE Conference on Vehicular Electronics and Safety. pp. 31-34. Nov. 11-12, 2009.
Stevens. "Advanced Programming in the UNIX Environment." Addison-Wesley Publishing Company, pp. 195-196 (1992).
"Tokenworks Introduces IDWedge ID Scanner Solution." 2008.
Junker et al. "Evaluating OCR and Non-OCR Text Representation for Learning Document Classifiers." Proceedings of the 4th International Conference on Document Analysis and Recognition. Ulm, Germany. Aug. 18-20, 1997. pp. 1060-1066 (1997). Accessed http://citeseerxist.psu.eduviewdoc/download?doi=10.1.1.6.6732&rep=rep1-&type=pdf.

BROWSER-BASED MOBILE IMAGE CAPTURE

RELATED APPLICATIONS

This application is a continuation of U.S. patent application Ser. No. 17/189,085, filed on Mar. 1, 2021 and issued as U.S. Pat. No. 11,741,181 on Aug. 29, 2023, which is a continuation of U.S. patent application Ser. No. 14/568,085, filed on Dec. 11, 2014 and issued as U.S. Pat. No. 10,963,535 on Mar. 30, 2021, which claims priority to U.S. Provisional Patent App. No. 61/914,847, filed on Dec. 11, 2013, and is a continuation in part of U.S. patent application Ser. No. 14/042,677, filed on Sep. 30, 2013 and issued as U.S. Pat. No. 9,324,073 on Apr. 26, 2016, U.S. patent application Ser. No. 14/042,719, filed on Sep. 30, 2013 and issued as U.S. Pat. No. 9,672,510 on Jun. 6, 2017, and U.S. patent application Ser. No. 13/769,833, filed on Feb. 19, 2013 and now abandoned, which are all hereby incorporated herein by reference as if set forth in full.

BACKGROUND

1. Field of the Invention

Various embodiments described herein relate generally to the field of image capture using a mobile device. More particularly, various embodiments are directed to integrating mobile image capture with an internet-browser application on the mobile device.

2. Related Art

Mobile phone adoption continues to escalate, including ever-growing smart phone adoption and tablet usage. Mobile imaging is a discipline where a consumer takes a picture of a document, and that document is processed, extracting and extending the data contained within it for selected purposes. The convenience of this technique is powerful and is currently driving a desire for this technology throughout financial services and other industries.

Numerous applications utilizing mobile image capture have been developed for various financial services such as check deposits, bill pay, credit card balance transfers, and insurance account services, to name a few. These applications rely on the use of a third party application running on the mobile device that is managed by the service provider, such as a bank, utility or insurance company. The mobile image capture process is built into the third party application and is often customized for the particular third party service through the use of specific user interfaces and image capture parameters that are designed to capture certain types of documents with known properties and content. The mobile image capture process is therefore limited to use only within the specific third party application and cannot be utilized for another purpose for which it has not already been integrated. This effectively prevents the use of mobile image capture for mobile devices which do not run these third party applications or for services which are accessed through a mobile web browser instead of the third party application that is resident on the mobile device.

Therefore, it is desirable to broaden the use of mobile image capture for use with additional services and platforms available on the mobile device.

SUMMARY

Disclosed herein are systems and methods for integrating mobile image capture with an internet browser application on a mobile device. Various embodiments provide for a user viewing a web page via the internet browser application to initiate a mobile image capture process on the mobile device through the web page, capture one or more images with a mobile image capture user interface, and then provide secure access to the one or more captured images for the web page to utilize the content of the one or more captured images. The mobile image capture process is accessible through any internet browser application via the mobile device and allows any service running on a web page to benefit from the ability to capture an image on the mobile device and obtain the content of the image through mobile image processing.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

DETAILED DESCRIPTION

The embodiments described herein provide for an internet browser application running on a mobile device to interface with a mobile image capture application running on the mobile device to provide for mobile image capture and processing for web-based services accessible through web pages on the internet browser application. This browser-based mobile image capture allows services which do not provide downloadable applications that run on the mobile device to utilize mobile image capture and processing features through the web browser. Additionally, mobile devices which do not provide or have access to third party applications can also utilize mobile image capture and processing. Furthermore, a mobile image capture application may be run on the mobile device as a standalone image capture application by the user of the mobile device in order to utilize the image capture and processing features apart from a related application.

System Overview

Figure 1A:
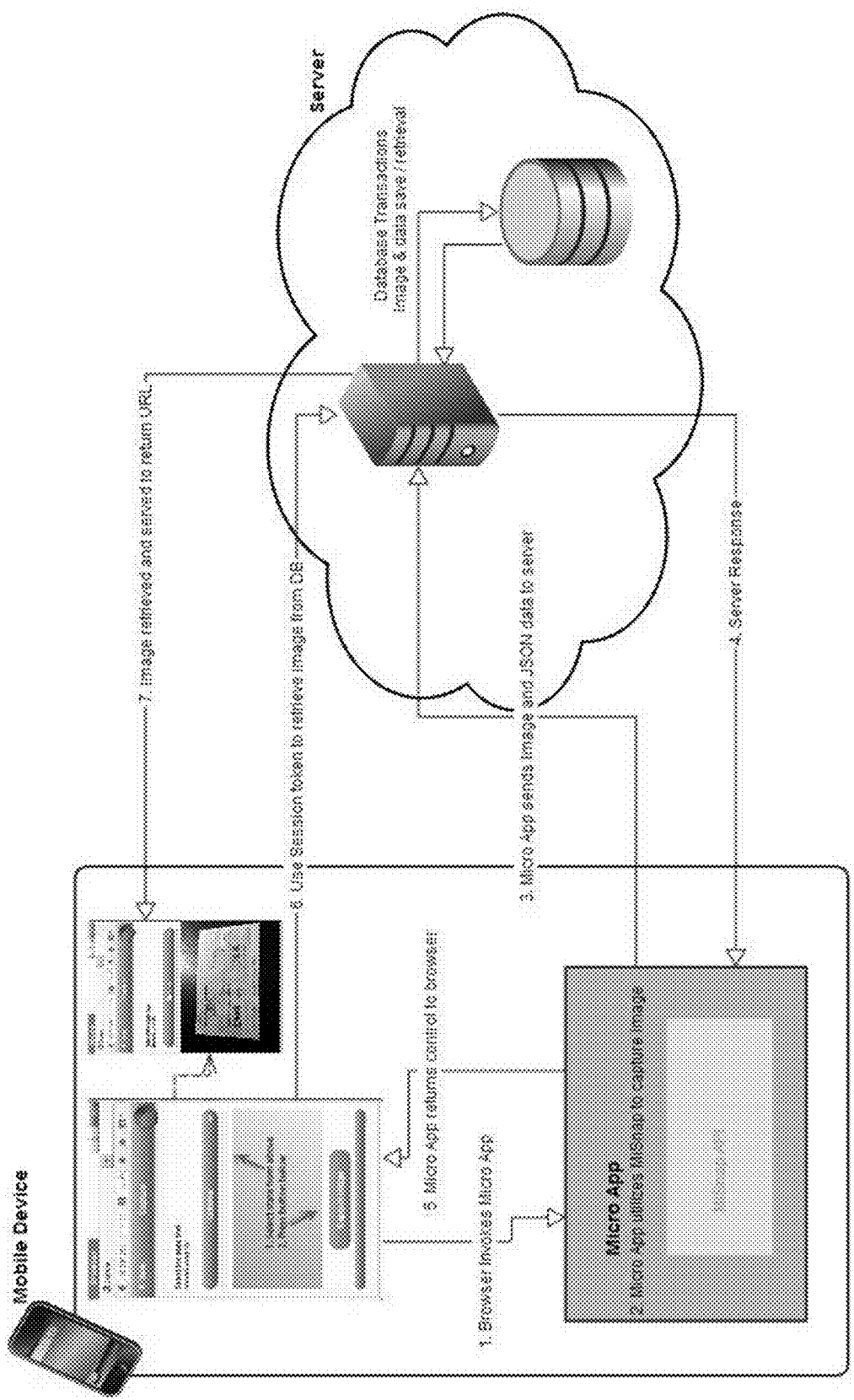
FIG. 1A is a workflow diagram illustrating an exemplary network topology that may be used for browser-based mobile image capture, according to embodiments.

FIG. 1A is a workflow diagram illustrating one embodiment of a system and method for browser-based mobile image capture. As illustrated in FIG. 1A, the system utilizes a mobile device for accessing the web-based service and the mobile image capture application and a server for storing and providing secure access to the captured images to the web-based service. The mobile device is configured to run at least one internet browser application which allows a user to access the Internet, and specifically web pages for services which require capturing one or more images with content required for providing the services. The mobile device may run more than one internet browser application which the user can select from when accessing a web page; however, the user can select any internet browser application when utilization of the mobile image capture process is needed.

The mobile device is also configured to run a micro application ("MicroApp") which interfaces with the browser to receive a request for mobile image capture, initiates a mobile image capture application and coordinates the transmission of the captured images to a remote server. The micro application also coordinates the transmission of schema from the browser to the mobile image capture application and the server which may pertain to the destination URL for the captured images or image capture settings to use when capturing the at least one image using the mobile device. In one embodiment, the schema may be transmitted using a JSON (JavaScript Object Notation) format. The mobile image capture application utilizes a camera on the mobile device and provides a user interface that allows a user to capture one or more high quality images with content that is needed for the web-based services. The features of the mobile image capture application provide for the user to easily and quickly capture high quality images of content with the mobile device, such as documents, financial papers, identification cards, license plates, vehicle identification numbers (VIN) and other words, numbers and symbols that may be needed by a web-based service and which would otherwise require manual entry of the content through more cumbersome entry methods such as typing or touch-based inputs.

The server may be configured to receive the one or more captured images from the micro application and store the captured images in a connected database for access by the web-based service. The server may also receive the schema from the micro application with the data on the destination for the captured images. The captured images may be securely stored and provide limited access using a token-based system or other secure protocol to ensure that the captured images and any content extracted therefrom are utilized only for the specific service that the user selects. The server may then send a response to the micro application confirming that the image and related data has been received and stored, which may prompt the micro application to close and return the user to the browser application. As will be described in further detail below, the captured images may then be requested (securely via the token) by the web-based service that the user is accessing with the internet browser on the mobile device, after which the captured images are transmitted to servers for the web-based service (not illustrated herein) at the destination URL provided in the schema. In one embodiment, the servers for the web-based service may perform image correction on the received images to obtain images which meet certain standards and requirements for content extraction such that the content can be extracted with a high degree of confidence. The servers for the web-based service may then perform content extraction steps on the corrected images in order to produce a content file of the extracted content for use by the web-based service.

Figure 1B:
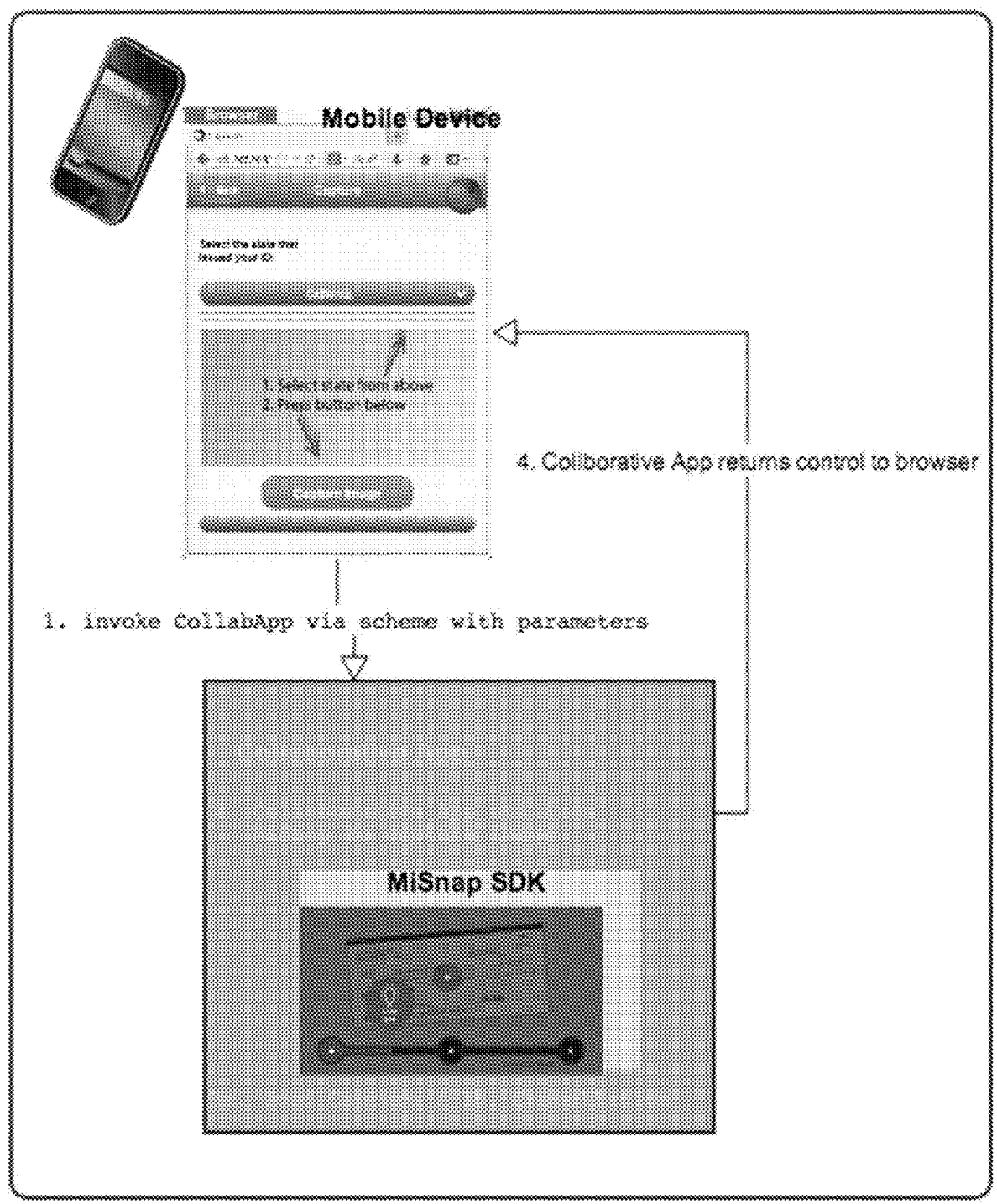
FIG. 1B is a workflow diagram illustrating an alternative exemplary network topology that may be used for browser-based mobile image capture, according to embodiments.

In an alternate embodiment illustrated in FIG. 1B, the captured images may be stored directly on the mobile device without needing to store the images at a remote server, and the captured images can then be transmitted directly to the servers of the web-based service directly from the mobile device. In this embodiment, the micro application (also known as the "Collaborative Application") provides for storing the one or more captured images in the RAM in the collaborative app on the mobile device, where it can then be retrieved within a short time frame using the same session GUID to ensure the security of the captured images.

It should be noted that although the micro application and mobile image capture (or "MiSnap") application are illustrated as separate applications, they may be integrated into a single application that is executable on the mobile device rather than separate applications which require separate executions. The configurability of the applications may depend upon the operating system of the mobile device, but will nonetheless provide the same functionality regardless of the integration or separation of these applications.

Exemplary Method

Figure 2:
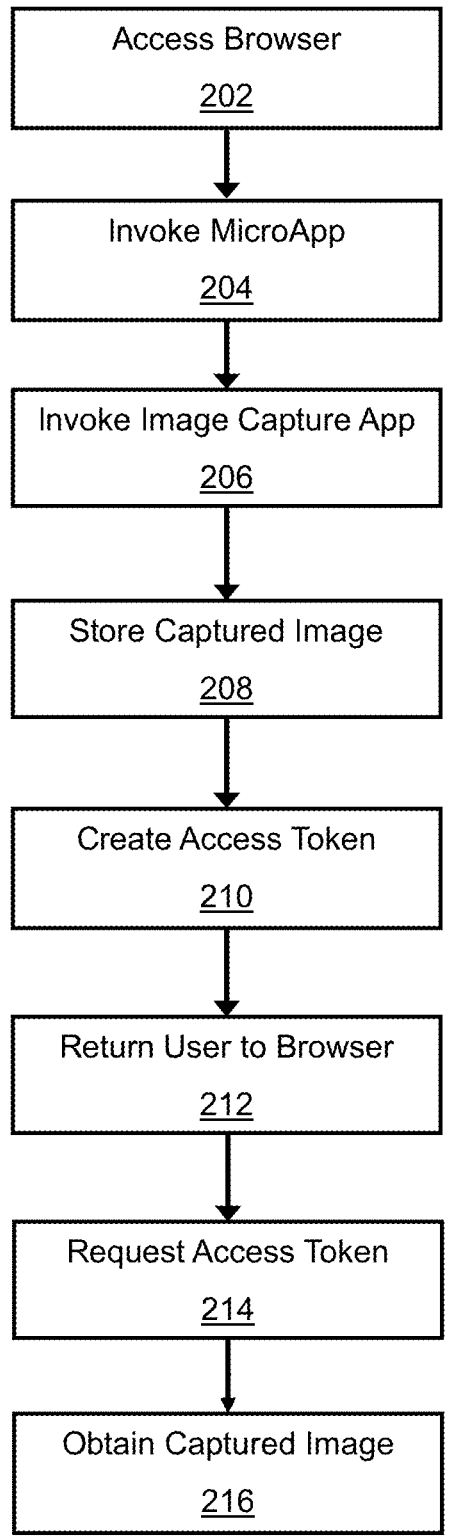
FIG. 2 is a flow diagram illustrating an exemplary method of performing browser-based mobile image capture according to embodiments.

One embodiment of a method for browser-based mobile image capture is illustrated in FIG. 2, beginning with the user accessing the internet browser application (step 202). When the user arrives at a web page which requests a mobile image of a document or other content, the user may select a hyperlink that invokes the micro application on the mobile device (step 204). The hyperlink may also contain information on the type of image, document or content to be captured and provide settings to the mobile image capture application that will improve the process and quality for capturing of the mobile image. In step 206, the mobile image capture application is invoked and one or more images are captured, after which the captured images are stored (step 208) on the remote server. An access token is created in step 210 which provides information specific to the capture of the images that will be used to verify that the captured and stored images are not requested by an unauthorized user. In step 212, the user is returned to the internet browser application where the user can then request the captured images using the token data (step 214) from the server. Once the token is authenticated, the captured images are obtained (step 216) by transmitting them from the stored location on the remote server to the server of the service providing the web page. The service will then extract the content from the captured images to utilize in providing the user with a particular service.

Figure 3:
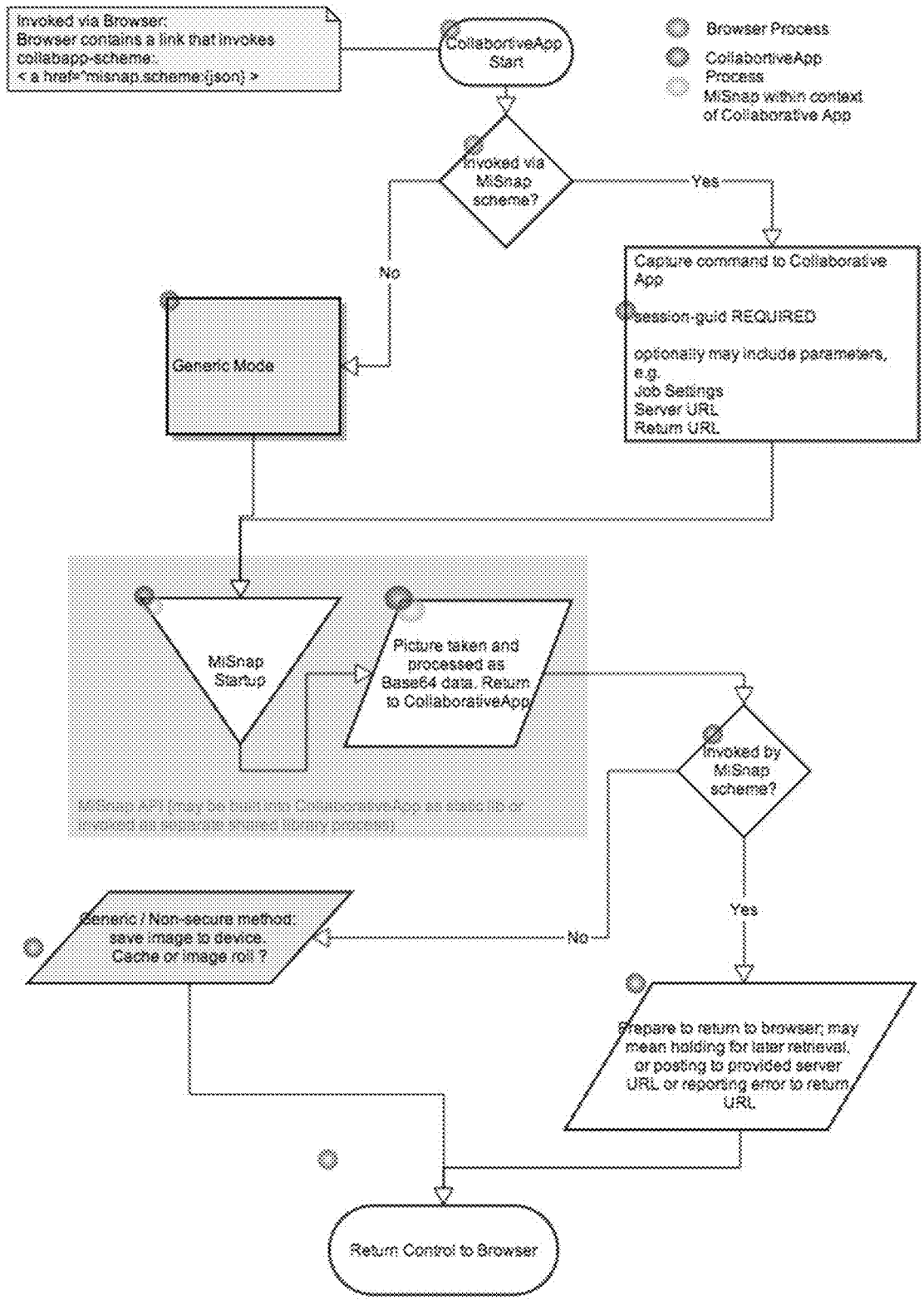
FIG. 3 is a flow diagram illustrating a further exemplary method of performing browser-based mobile image capture according to embodiments.

FIG. 3 illustrates a detailed flowchart of the process for browser-based mobile image capture, which illustrates the steps taken by the browser, the micro application and the mobile image capture application to provide the browser-based interface and image capture on the mobile device. In this embodiment, at the first step where the user selects a hyperlink on the browser, the hyperlink acts to invoke the micro application and first determines whether the micro application was invoked by the browser hyperlink or by another invocation means (such as a user launching the micro application directly on the mobile device for generic image capture applications). In one embodiment, the micro application may be integrated with the browser application as a plugin application which is automatically invoked by the web page at a certain step or which is invoked by the user selecting an icon for the plugin on the browser menu. If the micro application was invoked by the browser (Invoked—

Yes), several schema will be passed along from the browser hyperlink, including settings for image capture, a server URL where the captured images and a token should be stored, and a return URL where the browser may be pointed to once the images have been captured. If the return URL is included, the micro application will direct the browser application to the return URL. If no return URL is supplied, the user will be returned to the calling URL that initiated the micro application. Thus, the micro application may store the destination information for the captured image so that the captured image can be automatically sent back to the destination specified by the web service without requiring the user to perform a separate step. If the micro application was invoked by other means (Invoked—No), a generic mode of the micro application and mobile image capture application are initiated to provide for a general image capture application using the camera of the mobile device and allowing the user to send any captured images to a destination of their choice via numerous transmission modes (text message, e-mail, upload to a social media page, cloud storage, etc.).

Once the mobile image capture application is initiated, the camera on the mobile device is utilized along with a user interface which provides for automatic capture of images of a document or other content based on the schema passed in through the hyperlink. When the image or images have been captured, the mobile image capture application terminates. The micro application then determines whether the captured images were requested by the browser (Invoke—Yes) and transmits the captured images to the server. If the captured images were requested by other means (Invoke—No), the captured images may be saved within the memory of the mobile device or sent to a destination selected by the user using a user interface provided by the micro application.

When the captured images are transmitted to the server, a token is also created and stored at the server along with the captured images. The token is designed to prevent unauthorized access to the captured image, and may be created with data from one or more criteria which is associated with the captured images, such as a time stamp of the time the images were created, a device identifier which uniquely identified the mobile device which captured the images, or a user identifier for the user of the mobile device that the user has set up with the web page service provider, phone carrier or through the micro application. The token may also be instance specific in that it can only be used once, or it must be used within a certain period of time before it expires. The captured images can only be transmitted from the server when a proper request is made which identifies the address where the images are stored on the server (server URL) and provides the token which matches the token stored at the server. Once the token and captured images are transmitted to the server, the micro application terminates and the mobile device returns the user to the browser application. The browser application is still displaying the browser session with the web page that requested the captured images, and the browser can either automatically request the captured images or wait for the user to select a link to then request that the captured images be transmitted to the server for the web page.

Additional Applications

In another embodiment, the internet browser may be configured to operate within the micro application such that the user uses the micro application to access the web page for the web service that requires mobile image capture. The embedded browser functionality within the micro application provides for streamlined functionality between the browser, micro application and mobile image capture application since the entire user interface and browser functionality takes place within a single application on the mobile device.

In another embodiment, the micro application may also provide independent functionality as a generic mobile image capture application which can be invoked separately from the internet browser where the user would like to capture one or more images of content for their own use or for use with an application that provides for uploading the image through another application or other communication means. For example, a service may require that an image be captured and then sent via a text message or e-mail message to an address for image processing and content extraction. The user could then initiate the micro application in the Generic Mode shown in FIG. 3 in order to capture one or more images using the mobile image capture application and then select an option to send the captured one or more images via text or e-mail message to a destination address for the service. The mobile image capture application on its own would provide benefits over a default image capture application on the mobile device by providing functionality for automatic capture of a high quality image based on a real-time evaluation of mobile device settings and the image settings.

Computer-Implemented Embodiment

Figure 4:
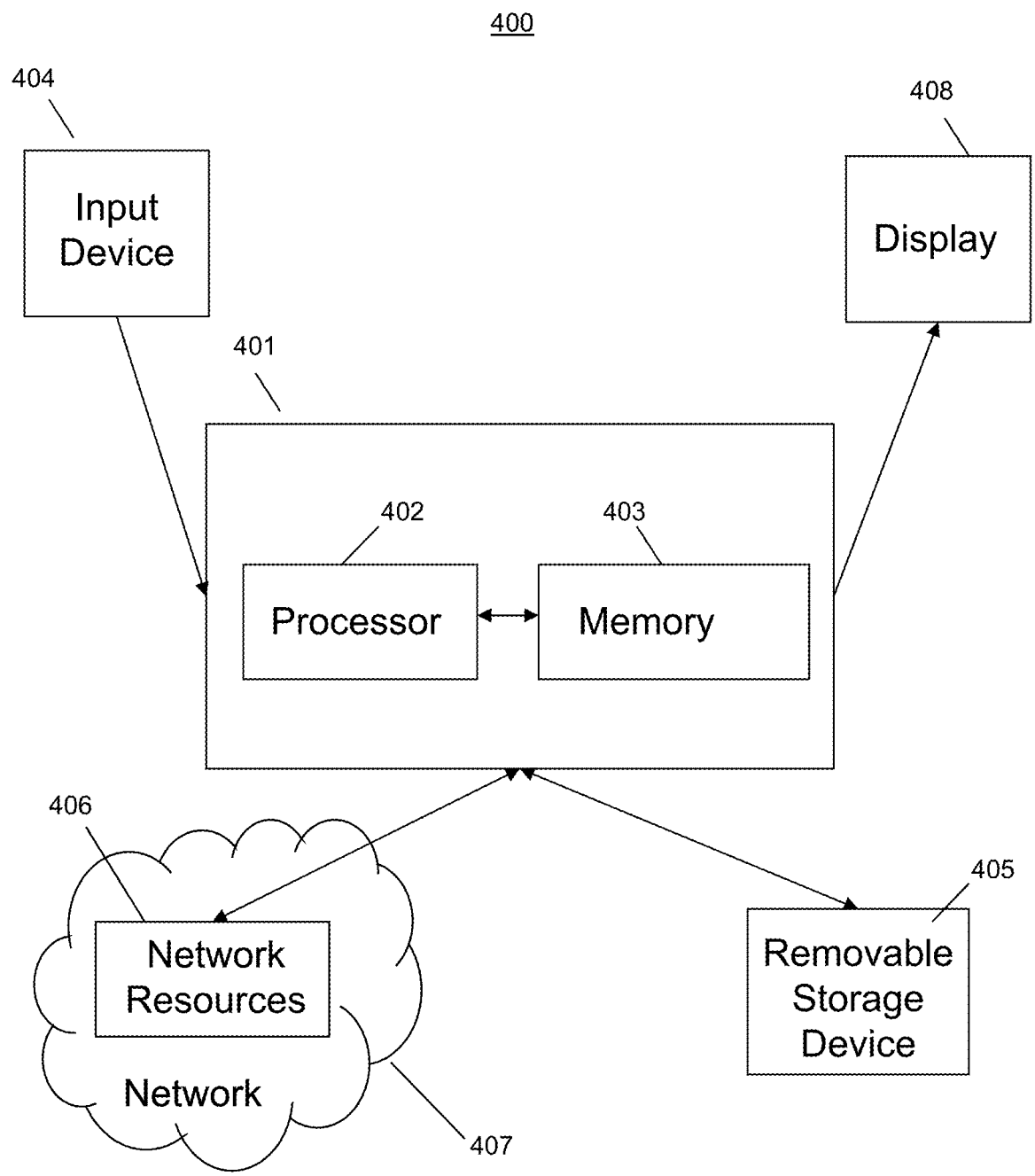
FIG. 4 illustrates a block diagram of an embodiment of a computer/server system upon which an embodiment of the inventive methodology may be implemented The various embodiments mentioned above are described in further detail with reference to the aforementioned figured and the following detailed description of exemplary embodiments.

FIG. 4 is a block diagram that illustrates an embodiment of a computer/server system 400 upon which an embodiment of the inventive methodology may be implemented. The system 400 includes a computer/server platform 401 including a processor 402 and memory 403 which operate to execute instructions, as known to one of skill in the art. The term "computer-readable storage medium" as used herein refers to any tangible medium, such as a disk or semiconductor memory, that participates in providing instructions to processor 402 for execution. Additionally, the computer platform 401 receives input from a plurality of input devices 404, such as a keyboard, mouse, touch device or verbal command. The computer platform 401 may additionally be connected to a removable storage device 405, such as a portable hard drive, optical media (CD or DVD), disk media or any other tangible medium from which a computer can read executable code. The computer platform may further be connected to network resources 406 which connect to the Internet or other components of a local public or private network. The network resources 406 may provide instructions and data to the computer platform from a remote location on a network 407. The connections to the network resources 406 may be via wireless protocols, such as the 802.11 standards, Bluetooth® or cellular protocols, or via physical transmission media, such as cables or fiber optics. The network resources may include storage devices for storing data and executable instructions at a location separate from the computer platform 401. The computer interacts with a display 408 to output data and other information to a user, as well as to request additional instructions and input from the user. The display 408 may therefore further act as an input device 404 for interacting with a user While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising using at least one computer processor of a mobile device to:
   within a browser application on the mobile device, retrieve a web page from a web server over at least one network, wherein the web page comprises a hyperlink to a micro application on the mobile device, and wherein the hyperlink contains a schema comprising one or more settings for image capture;
   in response to selection of the hyperlink in the web page within the browser application, invoke the micro application on the mobile device; and,
   by the micro application,
      initiate an image capture of one or more images using the mobile device in accordance with the schema contained within the selected hyperlink, and
      send the captured one or more images to a remote server over the at least one network.

2. The method of claim 1, wherein the remote server is the web server.

3. The method of claim 1, wherein the remote server is different from the web server, and wherein the captured one or more images are transmitted to the remote server with a token.

4. The method of claim 3, further comprising using at least one computer processor of the remote server to:
   receive the captured one or more images and the token from the mobile device via the at least one network;
   store the captured one or more images in association with the token;
   receive a request for the captured one or more images from the web server, wherein the request comprises a token; and,
   when the token in the request matches the token stored in association with the captured one or more images, send the captured one or more images to the web server.

5. The method of claim 4, further comprising using the at least one computer processor of the remote server to:
   temporarily store the captured one or more images in a memory of the remote server; and
   delete the captured one or more images from the memory in response to expiration of the token stored in association with the captured one or more images.

6. The method of claim 4, further comprising using the at least one computer processor of the remote server to perform image correction on the captured one or more images prior to sending the captured one or more images to the web server.

7. The method of claim 4, wherein the request further comprises a server Uniform Resource Locator (URL) identifying a location on the remote server at which the captured one or more images are stored.

8. The method of claim 1, wherein the captured one or more images are transmitted to the remote server with a destination Uniform Resource Locator (URL).

9. The method of claim 8, further comprising using at least one computer processor of the remote server to:
   receive the captured one or more images and the destination URL from the mobile device via the at least one network; and
   send the captured one or more images to the destination URL.

10. The method of claim 9, further comprising the at least one computer processor of the remote server to perform image correction on the captured one or more images prior to sending the captured one or more images to the destination URL.

11. The method of claim 1, further comprising using the at least one computer processor of the mobile device to:
    temporarily store the captured one or more images in a memory of the mobile device; and
    delete the captured one or more images from the memory in response to a session ending between the browser application and the web server.

12. The method of claim 1, further comprising using the at least one computer processor of the mobile device to close the micro application in response to a session ending between the browser application and the web server.

13. The method of claim 1, wherein the micro application is a plug-in of the browser application.

14. The method of claim 1, further comprising using the at least one computer processor of the mobile device to:
    receive an acknowledgement, from the remote server, that the captured one or more images were received by the remote server; and,
    in response to receiving the acknowledgement, close the micro application and return to the browser application.

15. The method of claim 1, further comprising using the at least one computer processor of the mobile device to, by the micro application:
    determine whether or not a return Uniform Resource Locator (URL) was provided during invocation of the micro application;
    when determining that the return URL was provided during invocation of the micro application, direct the browser application to the return URL; and,
    when determining that no return URL was provided during invocation of the micro application, return to the web page.

16. The method of claim 1, wherein the remote server is different from the web server, wherein the web page further comprises a request hyperlink, and wherein the method further comprises using the at least one computer processor of the mobile device to, in response to selection of the request hyperlink, send a request to the remote server that the captured one or more images be sent to the web server.

17. The method of claim 1, wherein the at least one network comprises the Internet.

18. The method of claim 1, wherein the one or more settings comprise one or more of a type of image to be captured, a document to be captured by the one or more images, or content to be captured by the one or more images, and wherein the schema is sent to the remote server with the captured one or more images.

19. A system comprising at least one computer processor configured to:
- within a browser application on the mobile device, retrieve a web page from a web server over at least one network, wherein the web page comprises a hyperlink to a micro application on the mobile device, and wherein the hyperlink contains a schema comprising one or more settings for image capture;
- in response to selection of the hyperlink in the web page within the browser application, invoke the micro application on the mobile device; and,
- by the micro application,
  - initiate an image capture of one or more images using the mobile device in accordance with the schema contained within the selected hyperlink, and
  - send the captured one or more images to a remote server over the at least one network.

20. A non-transitory computer-readable medium having instructions stored thereon, wherein the instructions, when executed by a processor, cause the processor to:
- within a browser application on the mobile device, retrieve a web page from a web server over at least one network, wherein the web page comprises a hyperlink to a micro application on the mobile device, and wherein the hyperlink contains a schema comprising one or more settings for image capture;
- in response to selection of the hyperlink in the web page within the browser application, invoke the micro application on the mobile device; and,
- by the micro application,
  - initiate an image capture of one or more images using the mobile device in accordance with the schema contained within the selected hyperlink, and
  - send the captured one or more images to a remote server over the at least one network.

* * * * *